United States Patent [19]
Lihotzky-Vaupel

[11] Patent Number: 6,152,023
[45] Date of Patent: Nov. 28, 2000

[54] FRYER SYSTEM

[76] Inventor: Wolfram Lihotzky-Vaupel, Deggendorfer Strasse 14, D-94557 Niederalteich, Germany

[21] Appl. No.: 09/273,476

[22] Filed: Mar. 22, 1999

[30] Foreign Application Priority Data

Apr. 9, 1998 [DE] Germany ............... 298 06 067 U

[51] Int. Cl.[7] ............... A47J 37/00; A47J 37/12
[52] U.S. Cl. ............... 99/404; 99/330; 99/407; 99/409
[58] Field of Search ............... 99/330, 336, 403–418, 99/443 C, 443 R, 477; 126/391, 21 A; 219/388; 210/167, DIG. 8; 426/438, 523, 520

[56] References Cited

U.S. PATENT DOCUMENTS

| | | | |
|---|---|---|---|
| 4,228,730 | 10/1980 | Schindler et al. | 126/391 X |
| 4,269,113 | 5/1981 | Ishida | 99/404 |
| 4,685,386 | 8/1987 | Bezon | 99/443 C |
| 4,694,742 | 9/1987 | Dover | 99/407 |
| 4,732,080 | 3/1988 | Vita | 99/330 |
| 5,018,438 | 5/1991 | Grandi | 99/335 |
| 5,142,968 | 9/1992 | Caron et al. | 99/409 X |
| 5,322,006 | 6/1994 | Morioka et al. | 99/405 |
| 5,799,568 | 9/1998 | Warren et al. | 99/330 X |

FOREIGN PATENT DOCUMENTS 26 40 627  3/1978  Germany .

*Primary Examiner*—Timothy F. Simone
*Attorney, Agent, or Firm*—Oblon, Spivak, McClelland, Maier & Neustadt, P.C.

[57] ABSTRACT

A fryer system and a frying process have a continuous through feed operation. On an endless conveyor mechanism for the fryer system, there is arranged a plurality of receiving containers, which can accept frying goods. The receiving containers, which are essentially enclosed, are formed having a fill orifice on an upper face and a closeable drain orifice on an underface. At at least one fill station, a defined amount of a heated frying fluid can be poured through the fill orifice into the receiving containers with the drain orifice closed. At at least one drain station the frying fluid can be emptied out of the receiving containers with the drain orifice open. Through the fryer system and its a frying process, the consumption of frying fluid and consumption of energy can be significantly reduced yielding a good frying result.

14 Claims, 2 Drawing Sheets

FRYER SYSTEM

BACKGROUND OF THE INVENTION

1. Field of the Invention

The invention relates to a fryer system for frying in a through feed operation having an endless conveyor mechanism for which a plurality of receiving containers are arranged for circulation and are designed in each instance for receiving a defined amount of frying goods. Further, the invention relates to a process for frying in a through feed operation.

2. Description of the Related Art

Such a type of fryer system is disclosed for example in German Laid-Open Patent Application No. 26 40 627 A1. It comprises an endless conveyor mechanism with which a plurality of receiving containers are arranged for circulation and are designed in each instance for accepting a defined amount of frying goods, wherein the goods can be fried within the receiving container by a heated frying fluid. In the food industry such fryer systems are used for example in frying of so-called instant noodles, in which the preparation time or cooking time of subsequently instant food dishes is shortened by a frying process. For this process, defined portions of noodles, for example, clusters of noodles or blocks of noodles, in each case, are laid in the receiving containers, which are attached to a conveyor chain. The receiving containers are essentially formed from a wire meshing or feature an essentially fluid permeable base part, e.g. a plate having perforations. For frying, the receiving containers, together with the goods, pass through a frying oil bath, wherein the portion containers together with the goods are immersed into the heated frying oil.

With such types of fryer systems, there is a relatively high consumption of frying oil and energy, which is contributable, for one thing, to heavy volatilization, due to the large open surface of the frying oil in the frying bath and to the adhesion of oil adhering to the goods and adhering to the receiving container during extraction from the frying bath. Another problem exists in that parts of the goods escape from the receiving containers into the frying bath and contaminate the bath. Despite continual cleaning of the frying oil, the oil has to be replaced at relatively short periods of time. With conventional systems, there can be an oil consumption of up to 1000 kg and more per hour. A high oil consumption is disadvantageous both from an economic point of view as well as from the aspect of environmental objections.

SUMMARY OF THE INVENTION

It is an object of the invention to provide a fryer system and a frying process with which ensures a reduced consumption of frying oil and energy coupled with, at the same time, a good frying result.

According to the invention, the task is resolved by a fryer system and by the frying process disclosed.

The invention is characterised by the fact that each receiving container is designed as an essentially enclosed container having a fill orifice on an upper face and a closeable drain orifice on the underface, that at least one fill station is provided for the filling of a defined amount of heated frying fluid through the fill orifice in the receiving containers with the drain orifice closed, and that at least one drain station is provided for draining of the frying fluid from the receiving containers with the drain orifice open.

Since the frying fluid, especially a vegetable frying oil or a water based mixture, is poured directly into the receiving containers containing the frying goods, the need for any frying oil bath is obviated, and the associated high volatilization is avoided with the fryer system in accordance with the invention. Furthermore, the receiving containers only come in contact with the frying fluid internally, so that in comparison with the technological "state-of-the-art immersion" process, the oil losses through adhesion to the portion containers are reduced. The amount of frying fluid and the consumption of frying fluid necessary for frying can thus be reduced to approximately a third of the oil amount, which is needed for the technological state-of-the-art systems described.

According to the invention, a particularly good frying result is attained if a plurality of fill stations and a plurality of drain stations are arranged alternately along a path of conveyance of the endless conveyor mechanism. By repetitive filling of the receiving containers from above and the emptying of the containers in a downwards direction, a so-called "floating" effect is accomplished. Through this flowing process, any inclusion of air on the frying goods is for the most part obviated, so that a continuous throughfrying of the goods is reliably achieved. In addition, an optimal temperature of the frying fluid can be set. The frying fluid, heated to an optimal operating temperature, can thus be retained within the receiving container for a relatively short span of time, preferably for five seconds, until this container is emptied and subsequently replenished at the next fill station by replacement frying fluid at the required operating temperature.

A wide variety of mechanisms can be employed to open and close the drain orifice on the receiving containers, for example, a hinged lid at the base of the portion containers, which is closed at the fill station and opened at the drain station. However, according to the invention, it is preferable that a slide plate is arranged for the closing of the drain orifice of the receiving containers at the fill station along a part-section of the path of conveyance of the endless conveyor mechanism, and that during conveyance of a receiving container along the slide plate, the slide plate lies against the underface of the receiving container and slides, thus closing the drain orifice. One or a plurality of slide plates are arranged parallel to the path of the endless conveyor mechanism, for example, on a conveyor belt or a conveyor chain and essentially lie tightly against the underface of the receiving containers at an edge around the drain orifice. As long as the receiving container is moved with its underface sliding over the slide plate, any escape of frying fluid through the drain orifice is basically prevented. The slide plate terminates in the direction of conveyance at the next drain station, so that at the end of the slide plate, there is no covering of the drain orifice and the frying fluid can run downwards in a simple manner. To retain the frying goods within the portion container, a grid can be provided at the base of the receiving container.

According to the invention, a particularly well sealed closure of the drain orifice is achieved if the slide plate is located by the spring method and if the slide plate is pretensioned to press against the underface of the receiving container. The slide plate is thus firmly connected by compression springs to the frame of the fryer system, wherein the receiving containers press the slide plate downwards against the compression force of the springs.

In order to ensure reliable pushing or sliding of the receiving containers onto the respective slide plate at the fill station, provision is made, according to the invention, for the slide plate to feature angled run-ons.

A simple and sturdy construction of the fryer system in accordance with the invention is thereby provided, such that the drain station is formed by a gap in the slide plate, through which the frying fluid can be emptied from the receiving containers into a collecting tank or bath.

In addition, it is, according to the invention, preferable that either filter means or heating means are provided, by which the frying fluid, for cleaning and reheating purposes, can be channeled from the collecting tank back to the fill station. In the case of a multiplicity of fill stations, a single filter device and a single heating facility can be provided centrally. Alternatively, it is also possible that the individual fill stations or certain groups of fill stations in each instance comprise separate filter means and heating means so that different preparations of the frying fluid for the individual stations can be facilitated. Thus, for example, contamination of the frying fluid caused by the process as a result of small particles of the frying goods falling off is greater at the first fill station in the direction of conveyance than at the last fill station. It can, therefore, be wise to provide more rigorous filtration or a shorter oil replenishment cycle for the frying fluid where fill stations are at the start of the frying process.

For a further reduction in energy consumption, it is expedient according to the invention, if a thermally insulated casing is provided, which at least surrounds the fill station, the drain station and surrounds the receiving containers passing thereby.

This embodiment is therefore preferably further enhanced if the return conveyance of the receiving containers is arranged within the thermally insulated casing. This ensures that the temperature differential between the receiving containers when filled with heated frying fluid is not too great, so that the frying fluid will not cool too rapidly. Insulation can, of course, be provided for the individual receiving containers, the insulation counteracting any undesired cooling.

In principle, separate heating of the receiving containers is feasible. However, to enable simple construction of the fryer system, in accordance with the invention, it is beneficial if the receiving containers are made from a material having a high thermal storage capacity.

Another embodiment of the invention exists in that, in the case of a multiplicity of fill stations involving a plurality of slide plates, the first slide plate in the direction of conveyance is designed shorter than the last slide plate in the direction of conveyance. In so doing, it must be taken into account that, at the start of the frying process, a proportion of the heat of the frying fluid is used to heat up the receiving containers, such that the frying fluid cools more quickly. A more rapid replenishment of the frying fluid is therefore needed by newly heated fluid. On the other hand, at the end of the frying process, the receiving container is basically heated up to the frying temperature, so that the frying fluid remains within the operating temperature range for a longer period of time.

In accordance with the invention, provision is made that a cleaning station is incorporated at the return conveyance of the receiving containers. By means of for example, spray nozzles, adhering residues of oil and frying goods can be removed.

A frying process for frying in a continuous through feed operation is provided, in which a plurality of receiving containers circulate, which in each instance are provided with a certain portion of a fried good, wherein the goods are fried within the receiving container by a heated frying fluid. This process is characterised in that a defined amount of heated frying fluid at at least one fill station is poured through a fill orifice into the receiving containers with the drain orifice closed and that the drain orifice is opened at at least one drain station and the frying fluid is emptied out of the receiving containers. The process is used, in particular, for frying of foods, for example, noodles, bake-products, fish, meat, poultry, vegetables, etc. It is preferable that filling and emptying is repeated a number of times in succession. It is beneficial that the heated frying fluid remains for a defined period of time within the receiving container, preferably between three and ten seconds, until the frying fluid is drained away. The duration and plurality of frying operations is dependent upon the frying goods and the speed of conveyance. An advantageous arrangement exists in that the frying fluid dwell time in the receiving containers increases in the course of conveyance in the case where there is a multiplicity of fill stations. Furthermore, it is possible that differing frying fluids are used at individual fill stations. As a result, a particularly high quality and taste appealing frying fluid can, for example, be used at the concluding frying station, since the final frying operation has a major influence upon the taste of the end product.

The invention is further explained in the following section with the aid of examples, which are depicted schematically in the drawings.

DETAILED DESCRIPTION OF THE DRAWINGS

Figure 1:
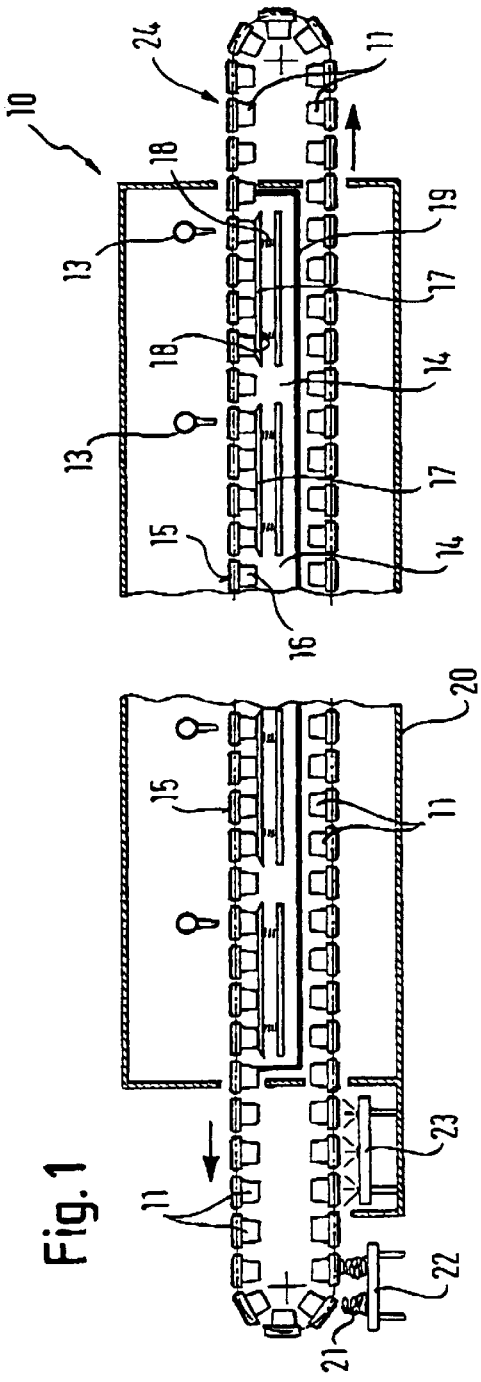
FIG. 1 is a cross sectional view of a fryer system from the side according to the invention.
Figure 2:
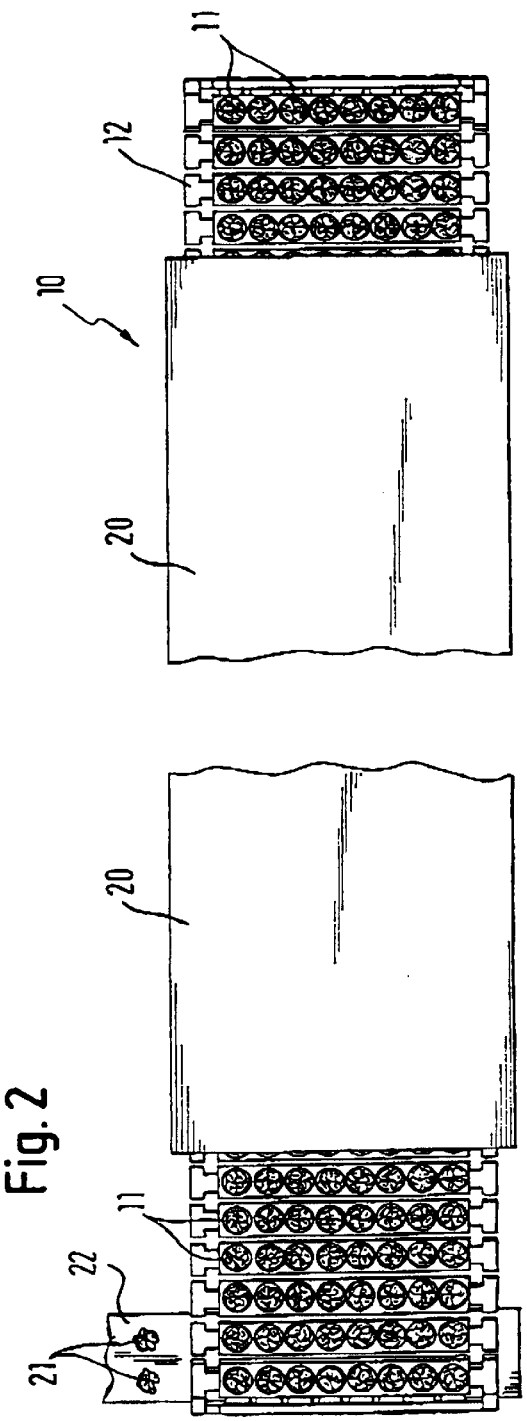
FIG. 2 is a top plan view of the fryer system of FIG. 1.

FIGS. 1 and 2 depict a fryer system 10 in accordance with the invention, with which pot-shaped receiving containers 11 are arranged in rows, each of eight receiving containers 11 on a conveyor chain 12 circulating around horizontally directed diverting shafts. The direction of circulation of the conveyor chain 12 is indicated by black arrows. In the region of a loading station 24, the individual receiving containers 11 are provided with a food item 21 to be fried. In the given case, the receiving containers 11 are designed for accepting so-called noodle clusters for instant noodle dishes. The individual receiving containers 11 comprise a fill orifice 15 on their upper face and a drain orifice 16 on their underside, wherein a closed side wall of the fill orifice 15 conically tapers towards the drain orifice 16.

The receiving containers 11 are conveyed from the loading station 24 by the conveyor chain 12 into the zone which is surrounded by a thermally insulated casing 20. Within the thermally insulated casing 20, there is arranged a multiplicity of fill stations 13 and drain stations 14 one behind the other alternately. To begin with, the respective receiving containers 11 are pushed in the direction of conveyance towards the first fill station 13 on to a horizontally arranged slide plate 17, which are provided with an angled run-on at their end-face. The slide plate 17 lies on the underface of the receiving containers 11, such that the drain orifice 16 is tightly closed. Upon effecting this closure of the drain orifice 16, hot frying oil is introduced from above through the fill orifice 15 into the receiving containers 11 by a spray injection nozzle. The receiving containers 11 thus filled are conveyed onwards along the slide plate 17 by the conveyor chain 12 so that, during the time of conveyance, the food item 21 is fried by the hot frying fluid.

At the following drain station 14 in the direction of conveyance, the slide plate 17 terminates, so that in pushing away the receiving containers 11 beyond the slide plate 17, the drain orifice 16 is opened. The frying fluid situated in the receiving containers 11 can consequently flow downwards at the drain station 14 into a collecting tank 19, from which the frying fluid is recycled and can be fed back to the fill stations 13.

The emptied receiving containers 11 are then pushed again onto a slide plate 17 at another fill station 13, at which the filling and frying operation is repeated for a defined period of time. Any given number of fill stations 13 and drain stations 14 may be arranged alternately one after the other according to the required frying operation. Between each fill station 13 and the next successive drain station 14, there is arranged, in each instance, a slide plate 17, which is located on its underface by compression springs 18. Due to the spring force of the compression spring 18, the slide plates 17 are flexibly pressed against the underface of the receiving containers 11, so that adequate sealing of the drain orifices 16 is assured.

After finally taking away the filtered fluid from the receiving containers 11, the receiving containers leave the thermally insulated casing 20 and are guided to a discharge station 22. By diverting the receiving containers 11 downwards around a diverter roller, the finish-treated food item 21 drops onto a conveyor belt, which transports away the item 21. The receiving containers 11 are then cleaned at a cleaning station 23 by the spraying of a cleaning fluid.

The return conveyance of the receiving containers 11 by the conveyor chain 12 occurs in essence through the insulated casing 20, whereby any undesirably severe cooling of the receiving containers 11 is counter-effected. After recharging the receiving containers 11 yet again at the loading station 24, the frying operation in the receiving containers 11 can be repeated, so that a continuous through feed operation is assured.

Figure 3:
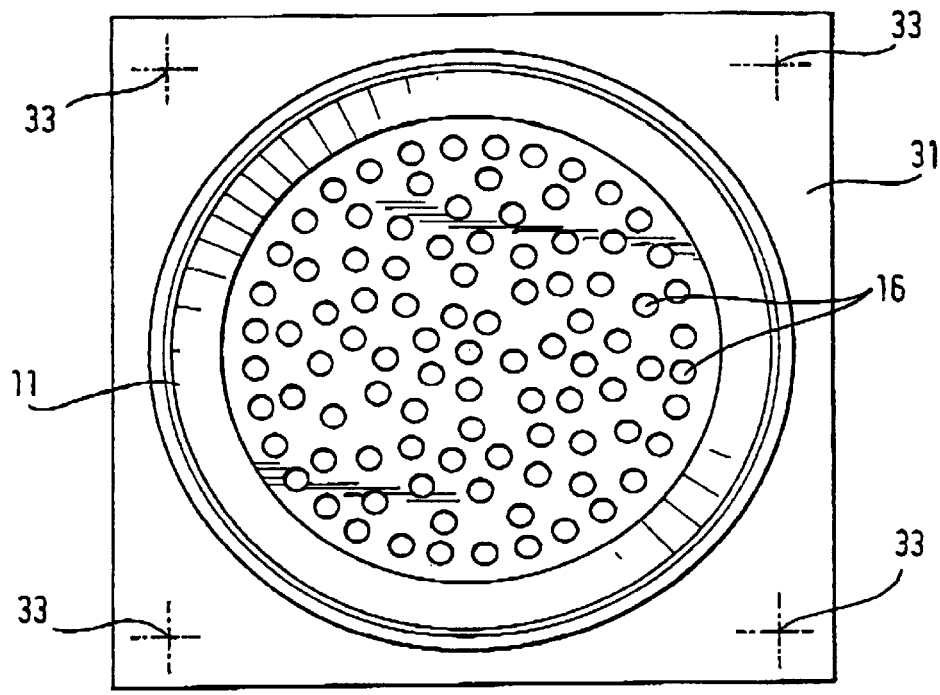
FIG. 3 is a top plan view of a portion container of another fryer system in accordance with the invention.
Figure 4:
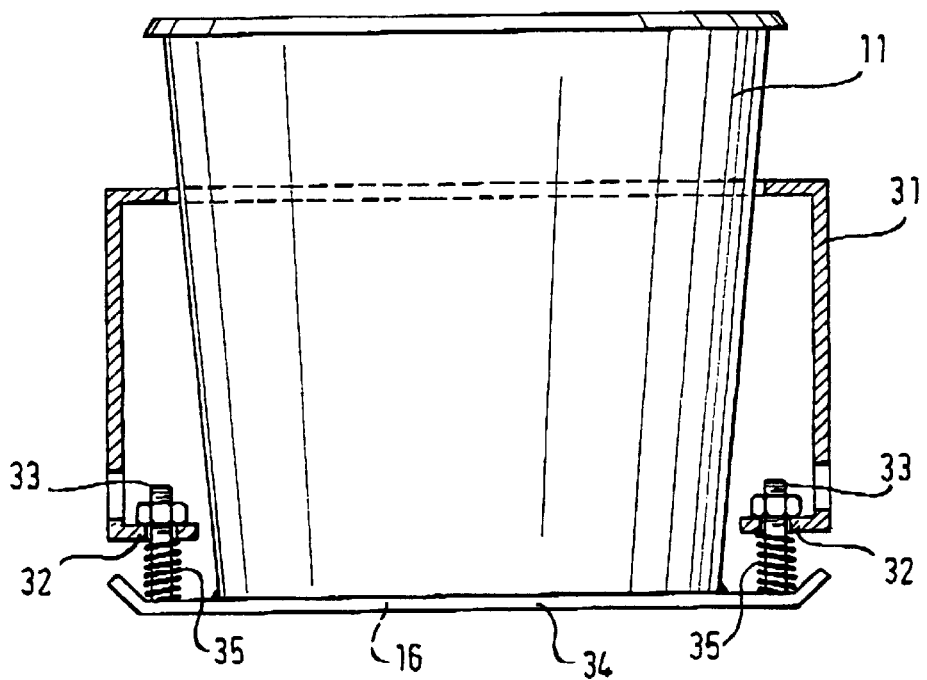
FIG. 4 is a cross sectional view of the portion container of FIG. 3.

A preferred holding device of a receiving container 11 on a conveyor chain is depicted in the FIGS. 3 and 4. To the conveyor chain, there is attached an almost box-shaped holding frame 31, in which the virtually pot-like receiving container 11 is arranged at a pitched distance. In a bottom zone, the holding frame 31 features strips 32 running inwards in approximately horizontal orientation, which are provided with two through holes. Through these through holes extend holding bolts 33 of smaller diameter, which are provided with threaded nuts on their upper ends and which form a shoulder for resting upon the strips 32. On the bottom end, the holding bolts 33 are, securely attached to a sealing plate 34, on which the pot-like receiving container 11 is welded. A spring 35 is arranged, in each case, around the holding bolt 33 for a flexible location of the receiving container 11 on the holding frame 31, said spring 35 being supported at the other end on the upper face of the sealing plate 34. This spring suspension of each individual receiving container 11 allows a certain degree of tilting and moving of the receiving container 11 in the holding frame 31 and thus a positive bearing contact and the tight sealing of the drain orifice 16 by the slide plate.

According to the invention, the sealing effect is thereby improved, such that the sealing plate 34 forms a relatively large bearing surface on the slide plate. In addition, the underface of the sealing plate 34 is ground. Furthermore, the end edges of the sealing plate 34 are angled, so that the positive action of sliding onto the slide plate is assured. In the illustrated embodiment, the drain orifice 16 is a plurality of small holes in the sealing plate 34, such that the sealing plate 34 represents, at the same time, a sieve-like retaining device for the frying goods.

What is claimed is:

1. A fryer system comprising:
    an endless conveyor;
    a plurality of receiving containers arranged for circulation on the endless conveyor, each of said receiving containers having a fill orifice on an upper face and a closeable drain orifice on an underside;
    at least one fill station provided for filling a defined amount through the fill orifice of each receiving container with the drain orifice closed; and
    at least one drain station provided for draining each receiving container with the drain orifice opened.

2. A fryer system according to claim 1, wherein a plurality of fill stations and a plurality of drain stations are arranged alternately one behind another along a path of transportation of the endless conveyor.

3. A fryer system according to claim 2, further comprising:
    a slide plate arranged at each fill station along a part of the path of transportation of the endless conveyor.

4. A fryer system according to claim 3, wherein said slide plate is spring-action mounted and pretensioned to press against the underside of each receiving container.

5. A fryer system according to claim 3, wherein said slide plate has at least one angled run-on.

6. A fryer system according to claim 2, further comprising:
    a collecting tank arranged underneath the plurality of drain stations.

7. A fryer system according to claim 1, further comprising:
    a cleaning station positioned underneath the plurality of receiving containers arranged for circulation on the endless conveyor.

8. A fryer system according to claim 1, further comprising:
    a thermally insulated casing having an entrance and an exit, said casing being provided to surround at least one fill station, at least one drain station, and the plurality of receiving containers passing therebetween.

9. A fryer system according to claim 8, further comprising:
    a loading station provided for the plurality of receiving containers adjacent to the entrance of the casing.

10. A fryer system according to claim 1, wherein each of the receiving containers is made from a material having a high thermal storage capacity.

11. A fryer system according to claim 3, wherein a plurality of the slide plates is provided with a first slide plate in the path of transportation being made shorter than a last slide plate.

12. A fryer system according to claim 8, further comprising:
    a discharge station provided at the exit of the casing.

13. A fryer system according to claim 1, wherein each of the receiving containers is flexibly spring-mounted on the endless conveyor.

14. A fryer system according to claim 1, further comprising:
    a sealing plate arranged around the drain orifice on the underside of each of the receiving containers.

* * * * *

UNITED STATES PATENT AND TRADEMARK OFFICE
CERTIFICATE OF CORRECTION

| | | |
|---|---|---|
| PATENT NO. | : 6,152,023 | Page 1 of 1 |
| DATED | : November 28, 2000 | |
| INVENTOR(S) | : Wolfram Lihotzky-Vaupel | |

It is certified that error appears in the above-identified patent and that said Letters Patent is hereby corrected as shown below:

<u>Title page,</u>
Item [30], the Foreign Application Priority Data is incorrectly listed. Item [30] should read as follows:

-- [30] Foreign Application Priority Data

Apr. 9, 1998    [DE]    Germany .................... 298 06 607.6

Signed and Sealed this

Twenty-third Day of October, 2001

Attest:

NICHOLAS P. GODICI
Attesting Officer    Acting Director of the United States Patent and Trademark Office